(No Model.)

C. N. TEETOR.
RAILROAD VELOCIPEDE.

No. 537,497. Patented Apr. 16, 1895.

WITNESSES:
L. Schaeff.
W. A. Richison.

INVENTOR:
Chas. N. Teetor.
BY Chas. E. Adamson,
ATTORNEY.

UNITED STATES PATENT OFFICE.

CHARLES NEWTON TEETOR, OF MUNCIE, INDIANA.

RAILROAD-VELOCIPEDE.

SPECIFICATION forming part of Letters Patent No. 537,497, dated April 16, 1895.

Application filed July 5, 1894. Serial No. 516,652. (No model.)

*To all whom it may concern:*

Be it known that I, CHARLES NEWTON TEETOR, a citizen of the United States, residing at Muncie, in the county of Delaware and State of Indiana, have invented certain new and useful Improvements in Railroad-Velocipedes; and I do hereby declare the following to be a full, clear, and exact description of the invention, such as will enable others skilled in the art to which it appertains to make and use the same.

My invention relates to improvements in railway velocipedes and the objects of my invention are to construct a rigid frame and provide the same with wheels having L-shaped cushioned tires which will move noiselessly on the railroad rails. I attain these objects by the mechanism illustrated by the accompanying drawings, in which—

Figure 1:
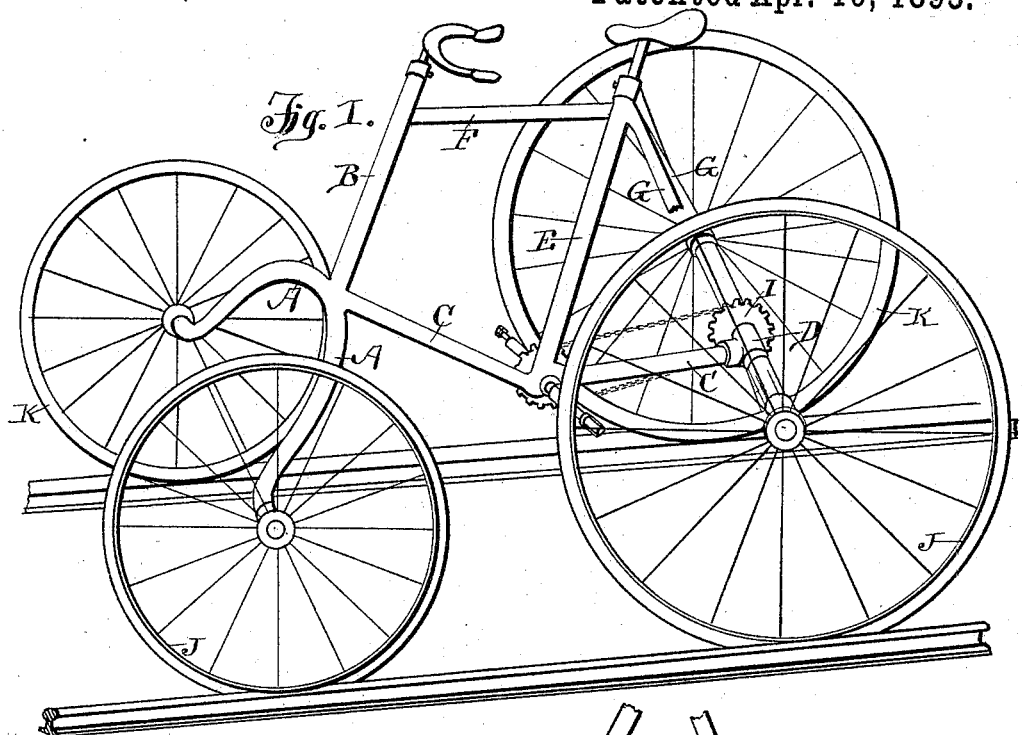
Figure 2:
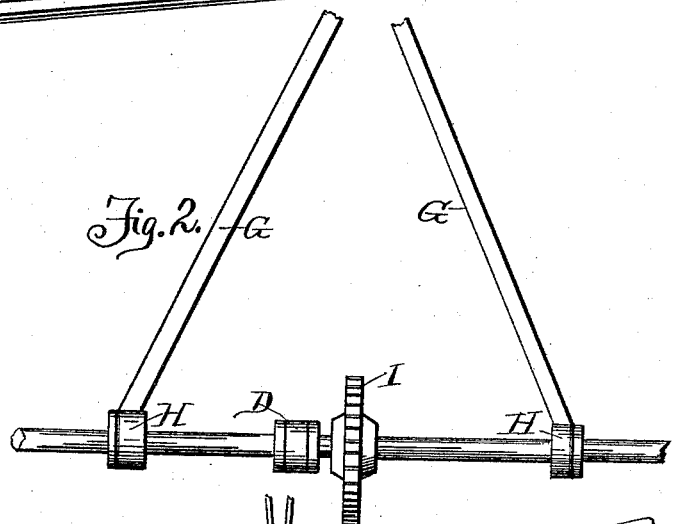
Figure 3:
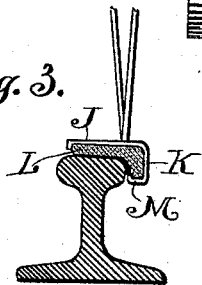
Figure 4:
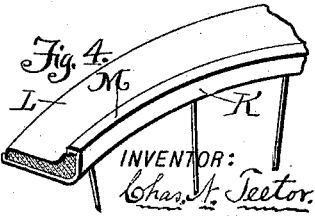

Figure 1 is a perspective view of my complete machine as ready for use. Fig. 2 is a rear view of a part of the rear axle and frame. Figs. 3 and 4 are detail views.

Similar letters refer to similar parts throughout the several views.

The frame consists of a front arch A having an upright post B and a bottom brace C, secured to the said arch all as shown. The lower brace C extends back to the rear axle to which it is secured by a ball bearing connection D. Near the center of the bottom brace is secured the pedal cranks and sprocket wheel, and from which extends upward the seat post E, all as in ordinary bicycle construction. The upper ends of the posts B and E are connected together by a cross bar F and the top of the post E is braced to the outer ends of the rear axle by braces G G, and the said braces connecting to the said axle by ball bearings H H, all of which is most clearly shown in Fig. 2.

The sprocket wheel I is rigidly secured to the rear axle so that the rear wheels of the machine are propelled by the chain connection and pedals as in ordinary cycles. The wheels are made with hubs and spokes of any approved design but the rim of the wheels is an important part of my invention. The rim J is provided with an inner flange K the outer edge of which turns back over the rubber cushion L, all as shown in Figs. 3 and 4. The rubber cushion is made in an L shape so that its surface will come in contact with the top and inner edge of the rail, rendering its movement on the rails almost noiseless.

The cushion is glued or otherwise secured to the rim J and that portion of the cushion which extends down along the inner edge of the rail is covered over by the edge M of the flange K being clamped around it, thus protecting the lower or outer edge of the cushion and preventing it from leaving the rim.

The handles and seat are made adjustable in height as in ordinary bicycles.

As thus constructed my velocipede is especially designed for use on ordinary railroads, as the construction of the frame will render it very light and rigid so that the wheels will not leave the track, except when lifted off, and the wheels are so cushioned as to prevent the metal rim from touching the rails in any manner and thereby rendering their movement on the rails almost noiseless.

Having thus described my invention, I claim the following and desire to secure the same by Letters Patent:

1. In a railroad velocipede, the combination with the wheel, of a rim on the wheel having an annular flange projecting from the inner side thereof, a noise deadening tire on the rim having an annular flange engaging the flange on the rim and means on the flange of the rim for securing the tire to the rim, substantially as described.

2. In a railroad velocipede, the combination with the wheel, of a rim on the wheel, an annular flange on the rim, a noise deadening tire on the rim having an annular flange engaging the flange on the rim and a flange on the annular flange of the rim engaging the flange on the tire, substantially as described.

In testimony whereof I affix my signature in presence of two witnesses.

CHARLES NEWTON TEETOR.

Witnesses:
E. J. TOMLINSON,
E. E. DAUGHERTY.